(Specimens.)

J. P. WETHERILL.
PROCESS OF FILTERING AND SEPARATING METALS.

No. 334,208. Patented Jan. 12, 1886.

WITNESSES
INVENTOR
John Price Wetherill
By his Attorneys

UNITED STATES PATENT OFFICE.

JOHN PRICE WETHERILL, OF BETHLEHEM, PENNSYLVANIA.

PROCESS OF FILTERING AND SEPARATING METALS.

SPECIFICATION forming part of Letters Patent No. 334,208, dated January 12, 1886.

Application filed July 15, 1885. Serial No. 171,661. (Specimens.)

*To all whom it may concern:*

Be it known that I, JOHN PRICE WETHERILL, of Bethlehem, in the county of Northampton and State of Pennsylvania, have invented certain new and useful Improvements in Processes of Filtering and Separating Metals, of which the following is a specification.

This invention relates to an improved process of separating or purifying metals and alloys of metals; and the invention consists, first, in subjecting the metals or alloys of metals in direct contact with the heating-gases to a temperature intermediately between the fusing-points of the individual metals or alloys composing the same and filtering the metal or alloy having the lowest fusing-point through a filter of suitable material from the metal or alloy having a higher fusing-point; and, secondly, producing a further separation or purification by allowing the metal or alloy so filtered to remain in molten state exposed to the heat, whereby the metal or alloy of higher specific gravity settles to the bottom, and the metal or alloy of lower specific gravity rises to the top, so as to be readily removed from above the heavier metal.

The invention consists, further, in submerging the filter in the molten metal either continuously or at given intervals during the process.

I have demonstrated by experiments that molten metals or alloys of metals cannot be filtered successfully through a refractory material unless the filter is submerged in molten metal either continuously or at short intervals. I have found that when this is not done the impurities or metals or alloys retained in the filter cement the filtering material together after a very short period, so as to prevent the filtration, thus rendering the process unsuccessful. I observed, further, that when a filter became so cemented together it was practically too expensive to remove it and put in a fresh filter, as the impurities, alloy, or metal retained in it form a hard and compact mass with the filtering material that could only be removed by chipping it off in small fragments with a chisel-bar at great cost of labor and loss of time to the operation. I found, further, that when a filter became so cemented it acquired a tendency to expand or swell, so much so as to burst its retaining-inclosure. The submersion of the filter in molten metal either continuously or at such short intervals as may be found necessary overcomes all these difficulties and renders the method practically successful.

Figure 1:
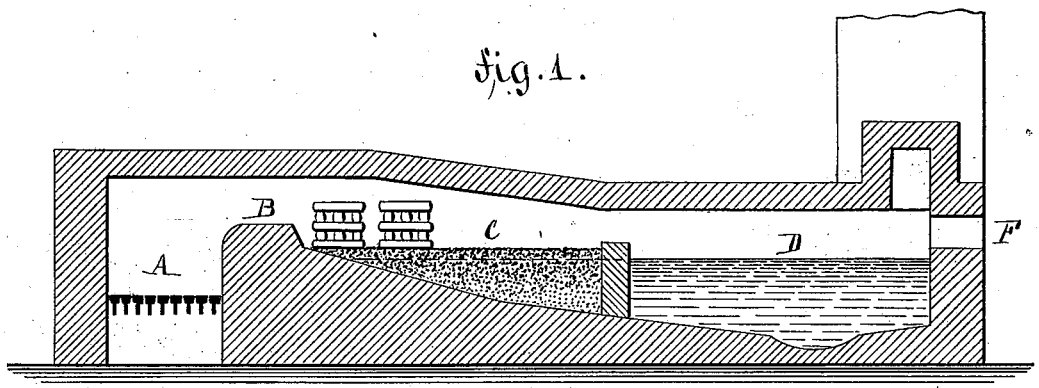
Figure 2:
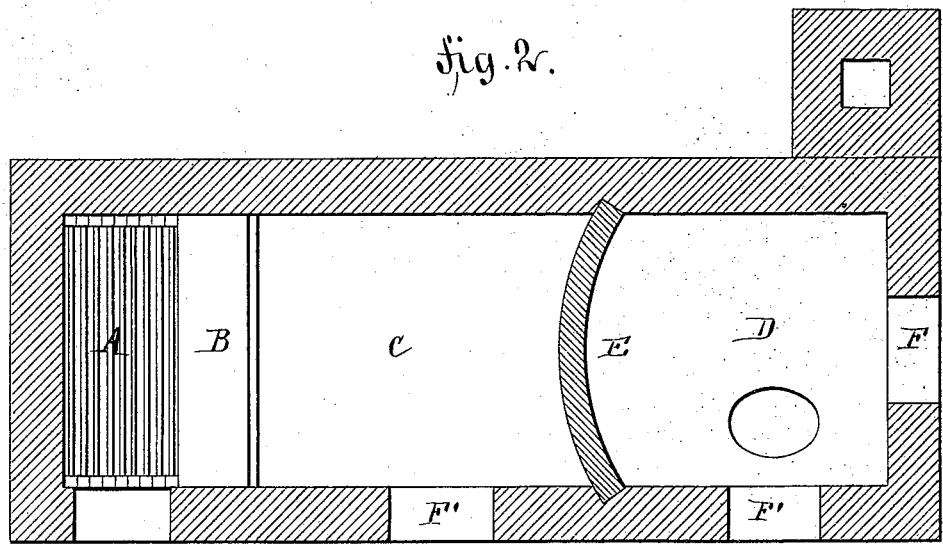
Figure 3:
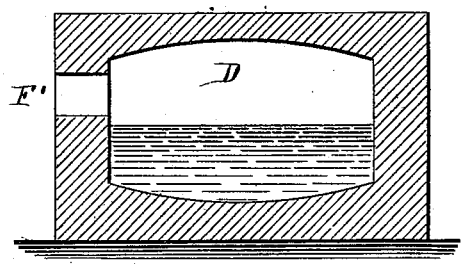

In the accompanying drawings, Figure 1 represents a vertical longitudinal section of a furnace for carrying out my improved process of separating or purifying metals or alloys of metals. Fig. 2 is a plan, and Fig. 3 a vertical transverse section, of the same.

Similar letters of reference indicate corresponding parts.

In carrying out my invention a reverberatory furnace is used having a fire box, A, and a fire-bridge, B, and a reverberating-chamber which is divided in its lower portion by a transverse wall, E, into two chambers, C and D. The transverse wall E is built up with bricks of refractory material, without mortar or cement, the bricks being loosely laid, so as to permit the passage between the bricks of the metal or alloy to be separated or purified.

The metals or alloys to be separated or purified are laid on a bed of gravel, sand, ganister, or any other suitable material, which is filled into the filtering-chamber C up to the height of the transverse wall E, and which serves as a filter. The products of combustion are passed over the filtering and settling chambers C and D in direct contact with the metals or alloys to be separated and with the filtering material in said filtering-chamber, and with the molten metal in said settling-chamber. The furnace is heated to a temperature intermediately between the melting-points of the metals or alloys of metals to be separated or purified, whereby the metal or alloy having the lower fusing-point melts, passes through the filtering material in the chamber C, and through the interstices of the loose brick wall E into the settling-chamber D, from which, after proper space of time for settling the heavier from the lighter metal or alloy, if any is present, it is ladled out through a door or tapped by suitable appliances, while the metal or alloy having the higher fusing-point is retained on or in the filtering material. The operation of filtering is carried on continuously, a fresh charge being put in the furnace as soon as the old one is exhausted, and twice every twenty-four hours the furnace is allowed to fill to nearly the level of the top of the wall E with molten metal, which is retained at the same level in the filtering and settling chambers, whereby the filtering material is held nearly submerged in the molten metal.

I have applied this process very successfully on a large scale to the separation of zinc from the iron and lead contained in galvanizers' dross, in which case the zinc and lead pass through the filter, while the iron combines with a portion of the zinc and forms a material known as "bottoms," which remains on and in the filter. The lead which passes through the filter with the zinc is separated therefrom in the settling-chamber, the lead sinking to the bottom and the zinc rising above it. The zinc is then removed with a ladle. Pure zinc is thus obtained from galvanizers' dross without subjecting it to the distillation process, thereby saving a very large amount of expense in production. The tendency of the filtering material to float in the molten metal is overcome by the weight of the metals or alloys of metals to be separated or purified resting upon it, or added weights, if necessary, in the beginning of the duration of a filter. Later in its duration I find that the heavier alloys settling in it constitute, with the material of the filter, a filtering material dense enough to remain in the molten metal, yet porous enough to perform the operation of filtering for a space of time varying from one to two weeks. The denser metal or alloy in the settling chamber or chambers is removed from time to time.

I am aware that the separation of metals by filtration has heretofore been proposed by the insertion of the metals, together with coal or coke, which is designed to constitute the filter, in clay muffles; but in that case the expansion of the metals in the filter breaks the muffles and renders the process practically unsuccessful. Moreover, such vessels are necessarily small, and only small quantities of metals could be treated at one time, and the metals are heated by the indirect contact of the fire-gases, involving the consumption of a comparatively large amount of fuel. In my apparatus the metals are in direct contact with the fire-gases, and large quantities can be successfully treated at the same time, and with a comparatively small quantity of fuel.

In application No. 171,660, filed July 15, 1885, I have claimed the apparatus which I prefer to use in carrying out my process.

Having thus described my invention, I claim as new and desire to secure by Letters Patent—

1. The process of separating and purifying metals and alloys of metals which consists, first, in subjecting them in direct contact with the heating-gases to a temperature intermediately between the fusing-points of said metals or alloys of metals; and, secondly, in passing the metals having the lower fusing-point through a filtering material at said intermediate temperature, substantially as set forth.

2. The process of separating and purifying metals and alloys of metals which consists, first, in subjecting them in direct contact with the heating-gases to a temperature intermediately between the fusing-points of said metals or alloys of metals; secondly, in passing the metals having the lower fusing-point through a filtering material at said intermediate temperature; and, thirdly, in causing the filtered metals or alloys to stand in a molten state exposed to the heat, so that the metals or alloys separate according to their different specific gravities, substantially as set forth.

3. The process of separating or purifying metals and alloys of metals which consists, first, in subjecting them to a temperature intermediately between the fusing-points of the metals or alloys to be separated or purified; secondly, in passing the metal or alloy having the lower melting-point through a filtering material; and, thirdly, in causing the molten metal or alloy to nearly submerge the filtering material for preventing cementation, substantially as set forth.

4. The process of separating and purifying metals and alloys of metals which consists of the following steps, first, subjecting them in direct contact with the heating-gases to a temperature intermediate between the different fusing-points of the metals or alloys of metals; second, passing the metals having the lower fusing-point through a filtering material; third, causing the molten metal or alloy to nearly submerge the filtering material for preventing cementation; and, fourth, causing the filtered metals or alloys of metals to stand in a molten state exposed to heat, so that the metals or alloys separate according to their different specific gravities, substantially as set forth.

In testimony that I claim the foregoing as my invention I have signed my name in presence of two subscribing witnesses.

JOHN PRICE WETHERILL.

Witnesses:
PAUL GOEPEL,
MARTIN PETRY.